United States Patent [19]
Andress et al.

[11] Patent Number: 6,022,167
[45] Date of Patent: Feb. 8, 2000

[54] CLOSURE SYSTEM FOR SECURING A PLASTIC COMPONENT TO A SUPPORT STRUCTURE

[75] Inventors: Heinz Andress, Erdmannhausen; Martin Haupt, Remseck, both of Germany

[73] Assignee: Filterwerk Mann & Hummel GmbH, Ludwigsburg, Germany

[21] Appl. No.: 08/973,265

[22] PCT Filed: May 11, 1996

[86] PCT No.: PCT/EP96/02032

§ 371 Date: Mar. 27, 1998

§ 102(e) Date: Mar. 27, 1998

[87] PCT Pub. No.: WO96/38315

PCT Pub. Date: Dec. 5, 1996

[30] Foreign Application Priority Data

Jun. 1, 1995 [DE] Germany ............... 195 20 155

[51] Int. Cl.⁷ .................................................. B25G 3/00
[52] U.S. Cl. ................................. 403/348; 403/353
[58] Field of Search .......................... 403/348, 349, 403/353; 285/401, 402

[56] References Cited

U.S. PATENT DOCUMENTS

| | | | |
|---|---|---|---|
| 3,427,552 | 2/1969 | Sauer et al. | 403/348 X |
| 4,600,277 | 7/1986 | Murray, Jr. | 285/402 X |
| 4,653,708 | 3/1987 | Rich | 403/348 X |
| 4,756,638 | 7/1988 | Neyret | 403/348 X |
| 4,768,545 | 9/1988 | Hoffman | 403/348 X |
| 5,397,157 | 3/1995 | Hempel et al. | 285/402 X |

FOREIGN PATENT DOCUMENTS

| | | |
|---|---|---|
| 0441461 | 8/1991 | European Pat. Off. . |
| 2276494 | 1/1976 | France . |
| 1249590 | 9/1967 | Germany . |
| 928633 | 6/1963 | United Kingdom . |

*Primary Examiner*—Terry Lee Melius
*Assistant Examiner*—William L. Miller
*Attorney, Agent, or Firm*—Evenson, McKeown, Edwards & Lenahan, P.L.L.C.

[57] ABSTRACT

A closure system for securing a plastic component to a support structure. The support structure is a substantially flat plate, especially a metal plate (11), having an opening (23) to accept the plastic component (10). The plastic component has at least one contact surface (12) to contact the support structure. There are also securing elements (14, 15) which are directed towards the contact surfaces and secure the plastic component (10) to the support structure after its introduction into the opening (23).

3 Claims, 3 Drawing Sheets

CLOSURE SYSTEM FOR SECURING A PLASTIC COMPONENT TO A SUPPORT STRUCTURE

BACKGROUND OF THE INVENTION

1. Field of the Invention

The invention relates to a closure system for securing a plastic component to a supporting structure in accordance with the preamble of the main claim.

2. Description of Related Art

Fastening systems for attaching plastic components to a supporting structure are known in a great variety of forms. For example, plastic components are equipped with snap fasteners. Also with bayonet fasteners. Especially in motor vehicles a great number of plastic components are fastened to a supporting structure, to a car body for example, with snap or catch fasteners. Great value is placed on a vibration-free fastening, but also on low manufacturing costs and quick installation.

SUMMARY OF THE INVENTION

The invention is addressed to the problem of creating a fastening system which has these advantages and also is in a position to fasten more complex plastic components to a simple supporting structure in a reliable manner.

This problem is solved, setting out from the preamble of the principal claim, by its distinctive characteristics.

The core idea of the invention is to configure the plastic component such that no complex operations on the supporting structure will be necessary, and that no additional elements will be needed on the supporting structure. This is achieved by equipping the plastic component both with a contact surface and with locking means, so that only an opening is required on the supporting structure.

In accordance with one embodiment of the invention it is proposed to provide detent projections on the plastic component or on the supporting structure which prevent the plastic component from falling out.

A further advantageous embodiment of the invention lies in the arrangement of inclined tabs on the securing elements. These provide for simple and quick assembly.

In a preferred manner, the supporting structure comprises a metal sheet. This sheet metal is, for example, part of the body of a motor vehicle and has a thickness in the range from 0.3 to 3 mm. The opening in the sheet metal is advantageously punched out. One advantageous application of the fastening system is seen in the case of the air intake tube for an internal combustion engine in a motor vehicle. This air intake tube usually leads through a part of the body in an area of the vehicle in which air carrying as little dirt or moisture as possible or air not heated by the motor can be drawn in. It was known to provide such intake tubes with ears or the like and to fasten them with sheet metal screws to a portion of the body. This kind of fastening is very reliable, and yet cost-intensive and requires much work to in the assembly process. If the air intake tube is equipped with the features of the plastic component [of the invention], then a simple but at the same time reliable fastening resistant to vibration is possible.

These and other features of preferred embodiments of the invention are to be found not only in the claims but also in the description and the drawings, and the individual features can be realized singly or plurally in the form of subcombinations in the embodiment of the invention and in other fields, and may constitute advantageous as well as independently patentable embodiments for which protection is hereby claimed. Embodiments of the invention are illustrated in the drawings and will be described in more detail below.

DESCRIPTION OF THE PREFERRED EMBODIMENT

Figure 1:
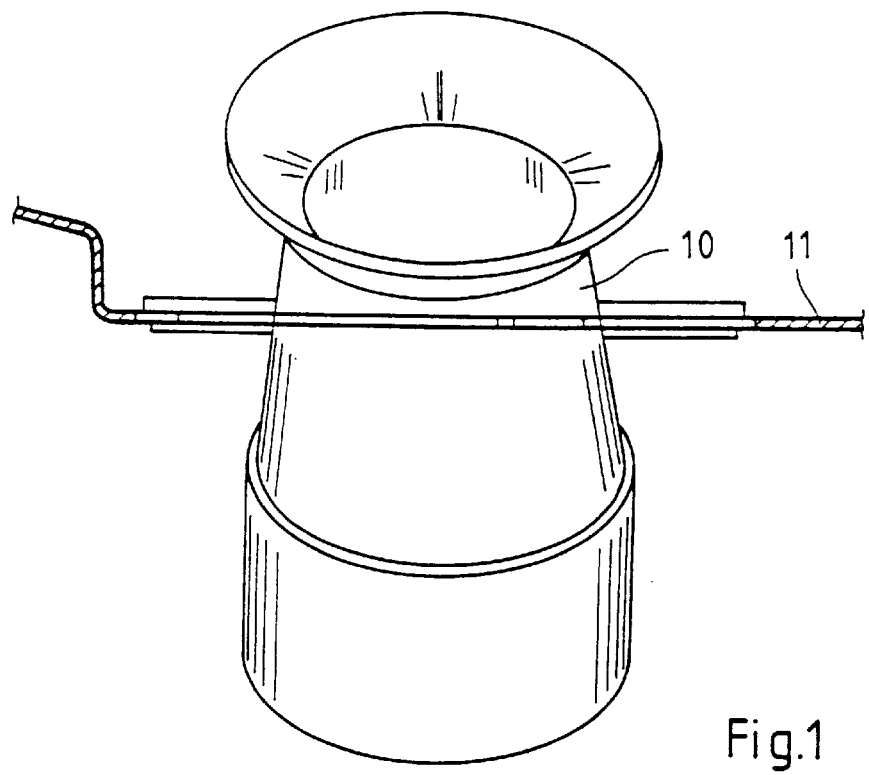
FIG. 1 shows a plastic component, in particular an air intake tube, which is disposed on a flat plate.

FIG. 1 shows a plastic component 10, in particular a part of an air intake tube for an internal combustion engine. This plastic component is secured to a flat plate, for example to a metal plate 11.

Figure 2:
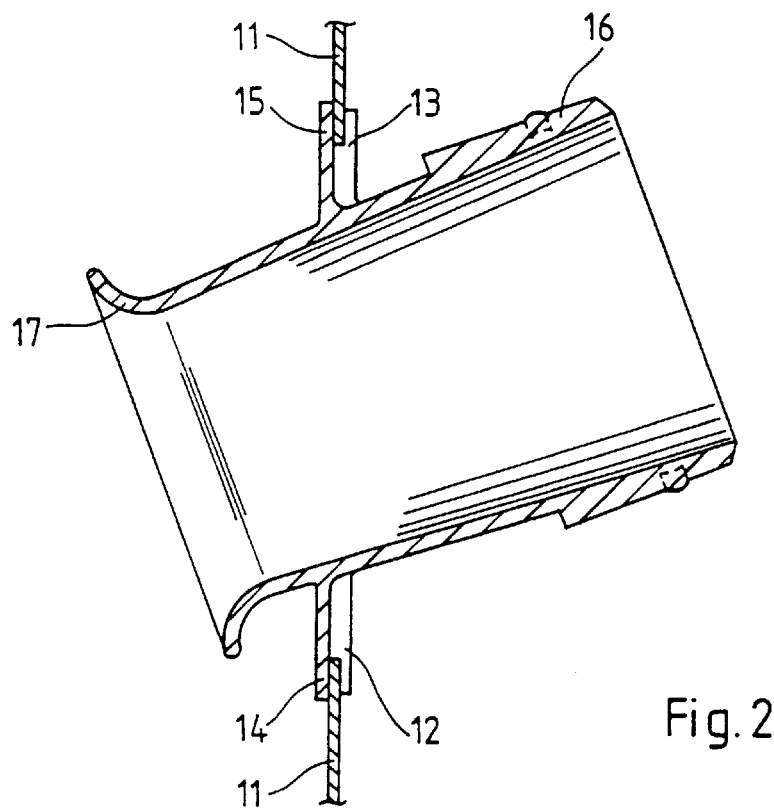
FIG. 2 shows a side view of the plastic component.

The plastic component 10 has, as shown in the side view in FIG. 2, contact surfaces 12 and 13. These make contact with the metal plate 11. Furthermore, on the plastic component, securing elements or counter-surfaces 14 and 15 are provided, which prevent loosening after assembly of the plastic component on the metal plate. A continuing duct, not shown here, is connected to the plastic component or intake tube at a fastening area 16.

Figure 3:
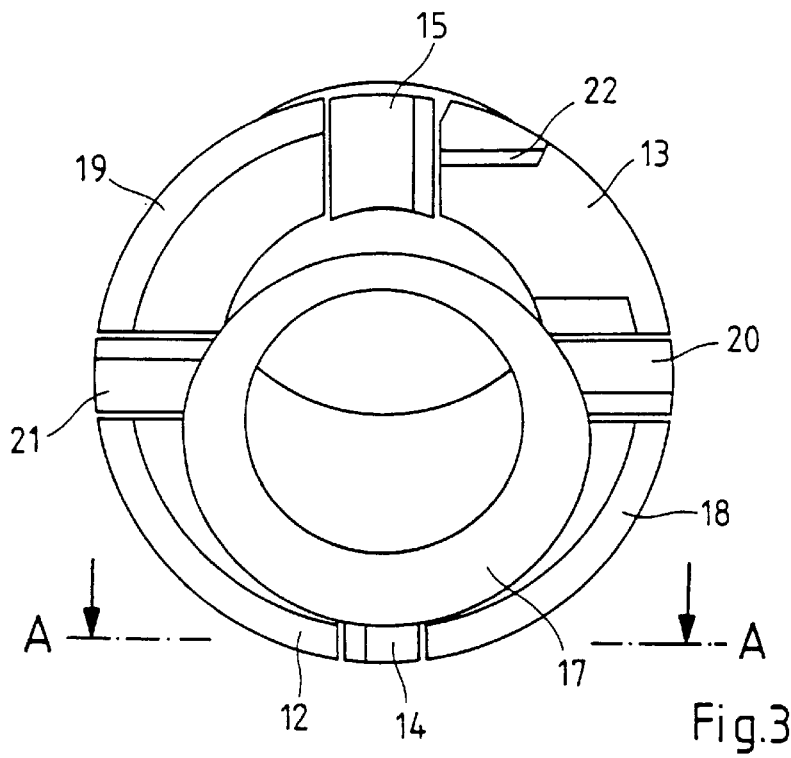
FIG. 3 shows a top plan view of the plastic component.

FIG. 3 shows a top view of the air intake tube with the contact surfaces 12 and 13 of the funnel-shaped opening 17, as well as the securing elements 14 and 15. In the area of the securing elements the contact surfaces 12 and 13 are cut out. The symmetrical configuration of the plastic component makes it possible to arrange additional contact surfaces 18 and 19 as well as additional securing elements 20 and 21. In this figure an inclined locking tab 22 is also to be seen. It is disposed on the contact surface 13.

Figure 4:
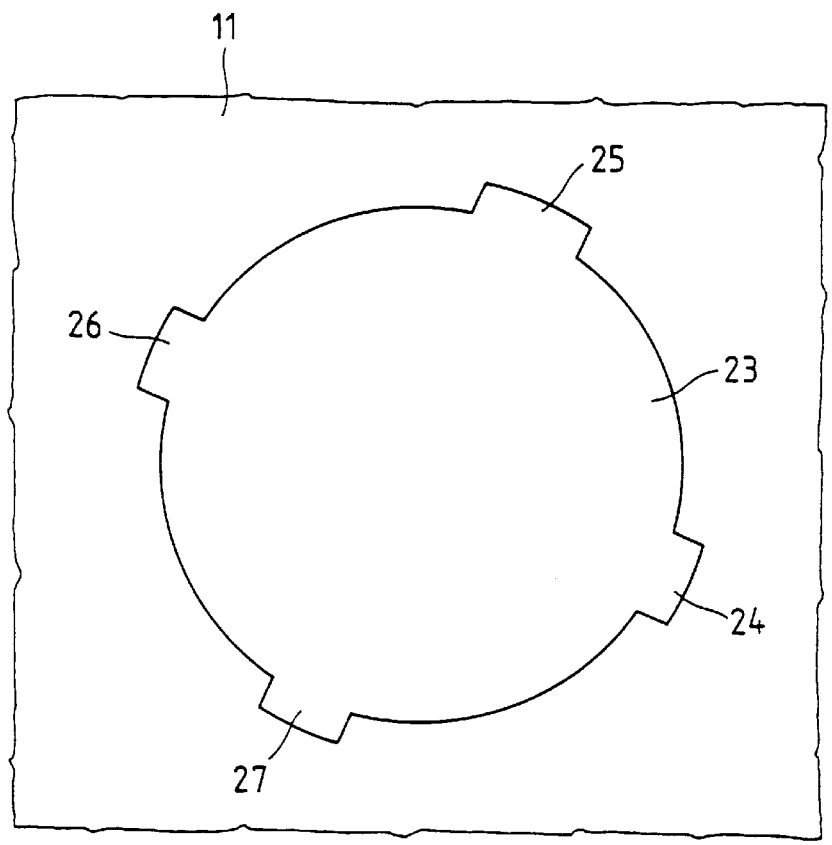
FIG. 4 shows the supporting structure with opening, and FIG. 5a–d the assembly steps taken in fastening the plastic component to a metal sheet.

FIG. 4 shows a section of a sheet metal plate 11 with the punched-out opening 23 for receiving the plastic component. While the securing elements 14 and 15 as well as 20 and 21 pass through the notches 24, 25, 26 and 27, the contact surfaces 12, 13 and 18, 19 of the plastic component lie on the segments which extend between the notches.

FIG. 5a to d shows the assembly steps in detail. The detail illustrations are sectional illustrations taken along the section A—A in FIG. 3.

The contact surfaces 12 and 18 of the plastic component are shown in FIGS. 5a to d, as well as the securing element 14. On the contact surface 12 or 13, as seen in FIG. 3, an inclined locking tab 28 is provided. In the position shown in FIG. 5a, the sheet metal 11 with the notched area 27 is not yet in contact with the plastic component.

Figure 5A:
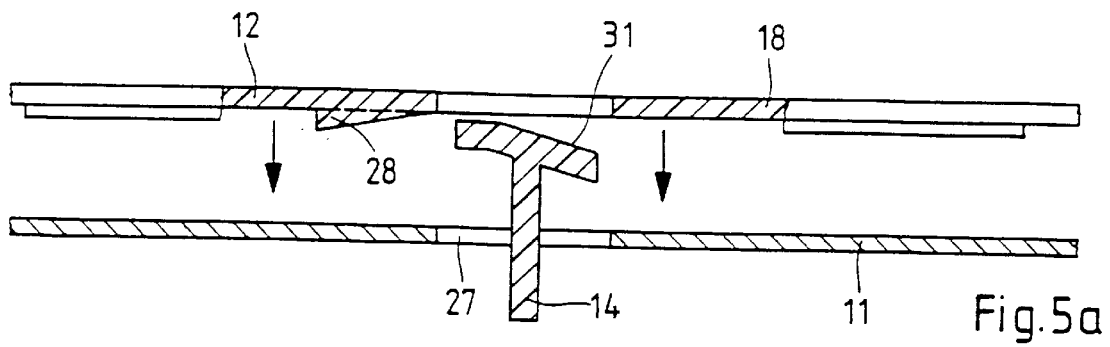
Figure 5B:
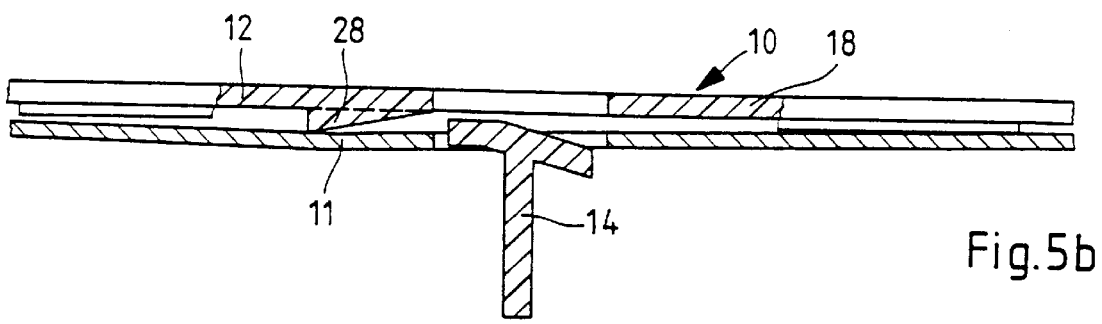

FIG. 5b shows the position wherein the plastic component 10 is already in the axial end position.

Figure 5C:
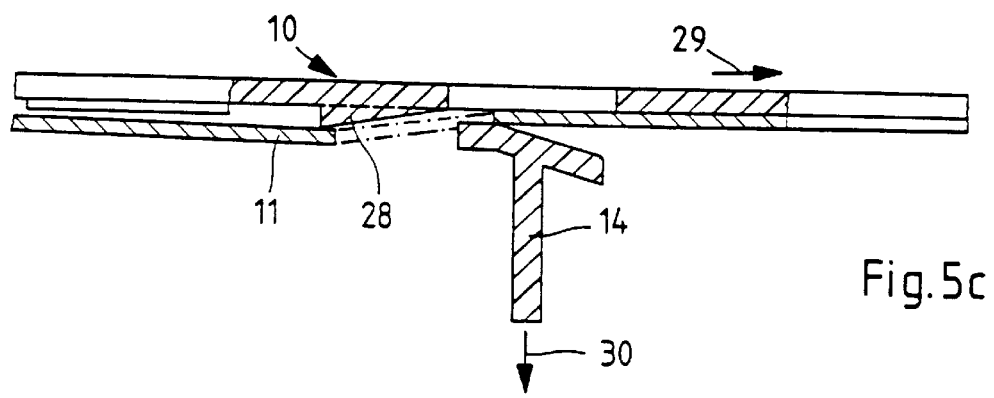

Then, according to FIG. 5c, the plastic component 10 is rotated in the direction of the arrow 29. The securing element 14 with the deflection ramp 31 flexes downward as indicated by arrow 30. The metal plate 11 slides on the left side over the inclined locking tabs 28.

Figure 5D:
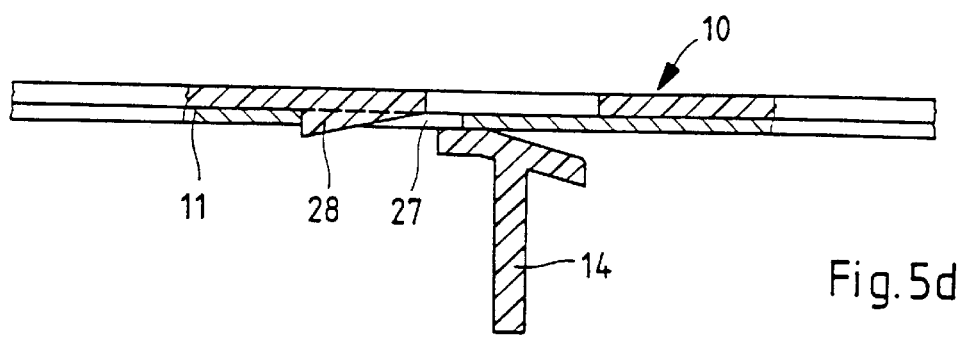

FIG. 5d shows the end position of the plastic component 10 in the locked position. The notch 27 punched in the metal plate is now above the inclined locking tab 28. Due to its elasticity, the securing element 14 applies an upward pressure to the metal plate 11. In conjunction with the inclined locking tab 28, the plastic component or air intake tube is secured in the intended position shown here.

The individual steps show that a simple, manually performed assembly of the plastic component is possible, whereby after the assembly, the plastic component is securely fastened to the supporting structure. By providing a tab on the back (opposite the inclined locking tab 28) the detent mechanism can be easily unlocked and the plastic component removed.

What is claimed is:

1. In combination, a plastic component having a fastening arrangement for securing the component to a support structure, the combination comprising:

said support structure further comprising a substantially flat metal sheet or plate having an opening therein for receiving the plastic component therethrough, said opening being provided with at least one radially outwardly extending peripheral notch; said fastening arrangement further comprising:

at least one contact surface on said plastic component adapted to engage one side of the support structure when said plastic component is received through said opening in said support structure;

at least one securing element on said plastic component which faces toward said at least one contact surface, said at least one securing element being configured to pass through said at least one notch when said plastic component is received through said opening in said support structure and then upon partial rotation of said plastic component in said opening to engage an opposite side of said support structure from said at least one contact surface; and at least one detent projection provided on the plastic component for preventing loosening of the plastic component;

each said securing element having a deflection ramp surface to facilitate its passage over said opposite side of said support structure.

2. The combination according to claim 1, wherein said detent projection comprises an inclined locking tab on said plastic component, said locking tab being lockingly received in said at least one notch when said plastic component is partially rotated in said opening in said support structure.

3. The combination according to claim 1, wherein said plastic component is a part of an air intake duct of an internal combustion engine of a motor vehicle.

* * * * *